United States Patent
Reitz

(10) Patent No.: US 8,807,454 B2
(45) Date of Patent: Aug. 19, 2014

(54) METHODS AND SYSTEMS FOR DELIVERING FLUID THROUGH HORNS FOR APPLYING MULTIPLE COMPONENT MATERIAL

(75) Inventor: Raymond Edward Reitz, Perrysburg, OH (US)

(73) Assignee: Finishing Brands Holdings Inc., Minneapolis, MN (US)

( * ) Notice: Subject to any disclaimer, the term of this patent is extended or adjusted under 35 U.S.C. 154(b) by 985 days.

(21) Appl. No.: 12/717,100

(22) Filed: Mar. 3, 2010

(65) Prior Publication Data
US 2010/0270390 A1    Oct. 28, 2010

Related U.S. Application Data

(60) Provisional application No. 61/173,597, filed on Apr. 28, 2009.

(51) Int. Cl.
*B05B 1/28* (2006.01)

(52) U.S. Cl.
USPC ............................................. 239/296; 239/8

(58) Field of Classification Search
CPC ............................ B05B 3/1092; B05B 5/0426
USPC ......... 239/290, 291, 239, 296, 302, 306, 304, 239/311, 314, 318, 366, 369, 398, 416.5, 239/417.3, 418, 423, 424, 525, 526, 527, 239/293, 294, 368, 413, 416.1, 419, 419.3, 239/419.5, 422, 426, 427, 427.3, 427.5, 239/428, 429, 430, 431, 433, 434
See application file for complete search history.

(56) References Cited

U.S. PATENT DOCUMENTS

| | | | | |
|---|---|---|---|---|
| 2,269,057 A | * | 1/1942 | Jenkins | 239/296 |
| 2,738,231 A | * | 3/1956 | Kurtz | 239/293 |
| 3,507,451 A | | 4/1970 | Johnson | |
| 4,278,205 A | * | 7/1981 | Binoche | 239/75 |
| 4,478,370 A | * | 10/1984 | Hastings | 239/707 |
| 4,519,321 A | * | 5/1985 | Poll et al. | 110/263 |
| 4,537,357 A | * | 8/1985 | Culbertson et al. | 239/290 |
| 4,846,405 A | * | 7/1989 | Zimmermann | 239/422 |
| 4,854,504 A | * | 8/1989 | Hedger et al. | 239/294 |
| 4,927,079 A | | 5/1990 | Smith | |
| 5,209,405 A | * | 5/1993 | Robinson et al. | 239/296 |
| 5,303,865 A | * | 4/1994 | Bert | 239/9 |
| 5,400,971 A | * | 3/1995 | Maugans et al. | 239/416.1 |
| 5,419,491 A | * | 5/1995 | Breitsprecher | 239/9 |

(Continued)

FOREIGN PATENT DOCUMENTS

BE        1015269        12/2004

*Primary Examiner* — Davis Hwu
(74) *Attorney, Agent, or Firm* — Fletcher Yoder

(57) ABSTRACT

Embodiments of a spray gun incorporating techniques for delivering a spray fluid between, next to, or inside of horn holes of an air atomization cap are provided. In accordance with certain embodiments, the spray gun includes a fluid delivery tip assembly. The spray gun also includes an air atomization cap disposed coaxially around the fluid delivery tip assembly, wherein the air atomization cap comprises one or more shaping air horns configured to deliver shaping air, and each shaping air horn comprises a first spray fluid passage configured to deliver a first spray fluid between, next to, or inside of one or more shaping air streams from the shaping air horn. The spray gun also includes a second spray fluid passage configured to deliver a second spray fluid to a fluid tip exit of the fluid delivery tip assembly.

20 Claims, 6 Drawing Sheets

(56) References Cited

U.S. PATENT DOCUMENTS

Figure 1:
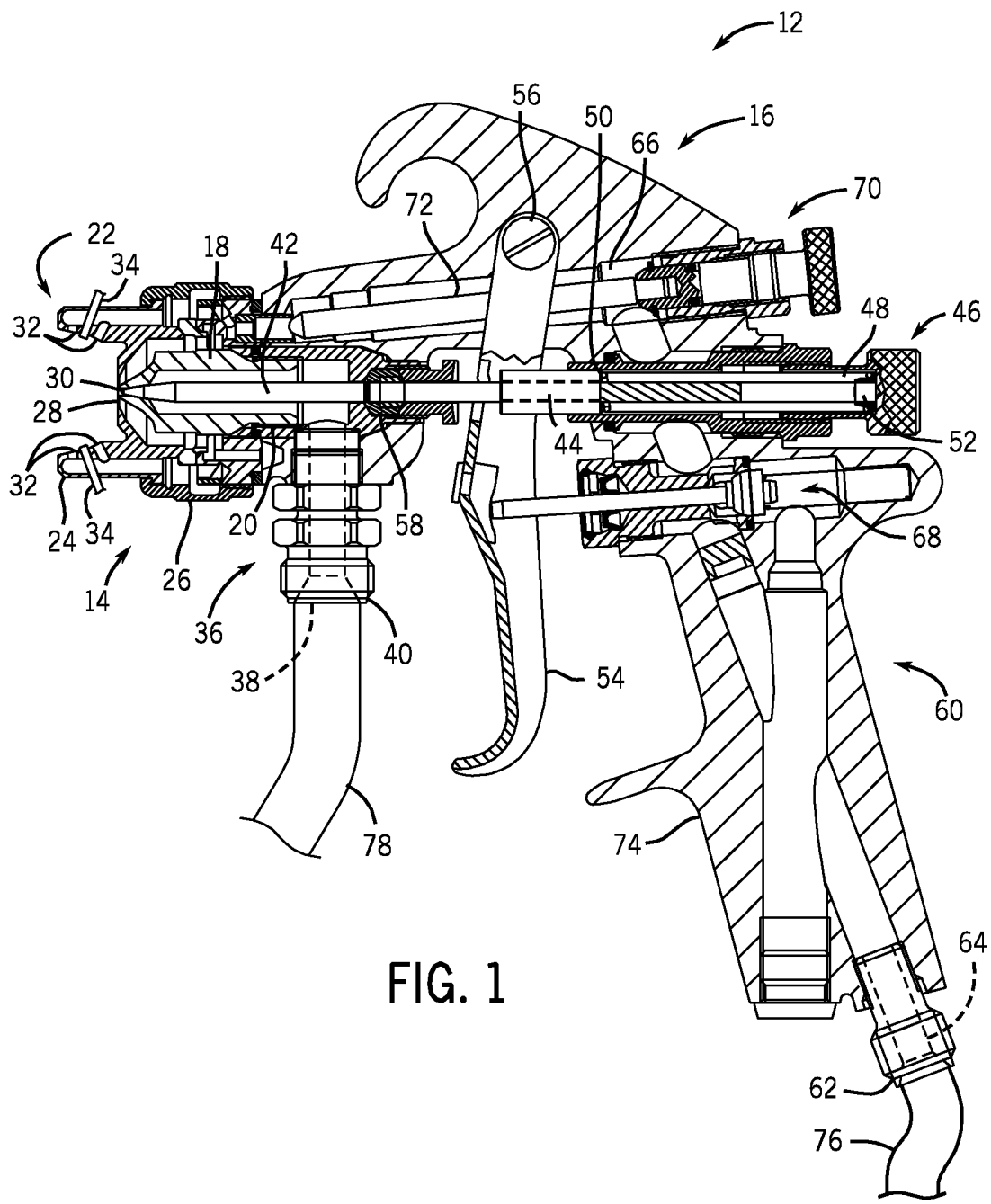

| | | | |
|---|---|---|---|
| 5,676,310 A * | 10/1997 | Hynds | 239/8 |
| 6,264,113 B1 | 7/2001 | Dingler | |
| 7,246,759 B2 * | 7/2007 | Turnbull | 239/525 |
| 7,318,554 B2 * | 1/2008 | Langeman | 239/400 |
| 7,614,379 B2 * | 11/2009 | Now | 123/184.53 |
| 7,950,598 B2 * | 5/2011 | Olson et al. | 239/340 |

* cited by examiner

METHODS AND SYSTEMS FOR DELIVERING FLUID THROUGH HORNS FOR APPLYING MULTIPLE COMPONENT MATERIAL

CROSS REFERENCE TO RELATED APPLICATION

This application claims priority from and the benefit of and incorporates by reference U.S. Provisional Application Ser. No. 61/173,597, entitled METHODS AND SYSTEMS FOR DELIVERING FLUID THROUGH HORNS FOR APPLYING MULTIPLE COMPONENT MATERIAL, filed Apr. 28, 2009.

BACKGROUND

The present invention relates generally to spray coating devices and, more particularly, to a spray gun configured to deliver a spray fluid between, next to, or inside of horn holes of an air atomization cap.

When multiple component coatings (e.g., paints) are used, they are typically mixed by a painter before the painter is ready to spray. Once the painter mixes the component materials together, a chemical reaction is started, and the painter has a limited time to apply the mixed material. Any left over material that the painter may have is then disposed of after the job. The cost of the wasted material may be significant. The spray apparatus must also be cleaned shortly after spraying to prevent the component materials from curing inside the spray apparatus, and also because the component materials may not be suitable for the next paint job because of the particular chemical reaction between the component materials.

BRIEF DESCRIPTION

Embodiments of a spray gun incorporating techniques for delivering a spray fluid between, next to, or inside of horn holes of an air atomization cap are provided. In accordance with certain embodiments, the spray gun includes a fluid delivery tip assembly. The spray gun also includes an air atomization cap disposed coaxially around the fluid delivery tip assembly, wherein the air atomization cap comprises one or more shaping air horns configured to deliver shaping air, and each shaping air horn comprises a first spray fluid passage configured to deliver a first spray fluid between, next to, or inside of one or more shaping air streams from the shaping air horn. The spray gun also includes a second spray fluid passage configured to deliver a second spray fluid to a fluid tip exit of the fluid delivery tip assembly.

DRAWINGS

These and other features, aspects, and advantages of the present invention will become better understood when the following detailed description is read with reference to the accompanying drawings in which like characters represent like parts throughout the drawings, wherein:

FIG. 1 is a cross-sectional side view illustrating an exemplary embodiment of the spray coating gun;

FIG. 2 is a cross-sectional side view illustrating an alternative embodiment of the spray coating gun;

FIGS. 3A and 3B are partial cross-sectional side views illustrating an exemplary embodiment of the spray tip assembly of FIGS. 1 and 2;

FIGS. 4A and 4B are partial cross-sectional side views illustrating an alternative embodiment of the spray tip assembly of FIGS. 1 and 2;

FIGS. 5A and 5B are partial cross-sectional side views illustrating another alternative embodiment of the spray tip assembly of FIGS. 1 and 2; and FIGS. 6A and 6B are partial cross-sectional side views illustrating yet another alternative embodiment of the spray tip assembly of FIGS. 1 and 2.

DETAILED DESCRIPTION

The current automotive refinishing market is dominated by gravity feed spray guns that have a coating material reservoir mounted on top of the spray gun. When the trigger of the spray gun is pulled, an air valve opens allowing atomization air and pattern shaping air to flow to the air cap. As the trigger is pulled further back, the fluid needle unseats from the fluid tip allowing the material to flow from the reservoir to the fluid tip. The material then exits the fluid tip, where it is atomized and the atomized particles are shaped into a spray pattern. However, as described above, when using this type of spray gun, the user of the spray gun may only have a limited amount of time to apply the material after mixing. In addition, this type of spray gun may lead to waste of unused mixed material left over from the spraying. In addition, the spray gun must be cleaned to prevent curing inside the spray gun. One solution is to use a pressure feed, two-component mixing system, but this type of system may be prohibitively costly and may consist of a cumbersome three-hose bundle to deliver the compressed air, the first component material, and the second component material.

As discussed further below, various embodiments of a spray gun configured to deliver a spray fluid between, next to, or inside of horn holes of an air atomization cap are provided. In particular, in accordance with certain embodiments, a first component material (e.g., a first spray fluid) may be delivered between, next to, or inside of horn holes of the air atomization cap. At the same time, a second component material (e.g., a second spray fluid) may be delivered from a fluid tip of the spray gun. The first component material delivered between, next to, or inside of the horn holes may be directed toward the second component material stream from the fluid tip. As such, the first and second component materials may converge and mix in front of the spray gun, instead of being premixed prior to spraying. By not premixing the first and second component materials, several shortcomings of conventional spraying techniques may be addressed. For example, excess waste materials may be reduced because the first and second component materials are only mixed upon spraying. In addition, because mixing generally occurs in front of the fluid tip exit of the spray gun, cleaning of the spray gun may be required less frequently and may be less time consuming. The mixing may be described as real-time mixing, on-demand mixing, or on-the-fly mixing.

Turning now to the drawings, FIG. 1 is a cross-sectional side view illustrating an exemplary embodiment of the spray coating gun 12. As illustrated, the spray coating gun 12 includes a spray tip assembly 14 coupled to a body 16. The spray tip assembly 14 includes a fluid delivery tip assembly 18, which may be removably inserted into a receptacle 20 of the body 16. For example, a plurality of different types of spray coating devices may be configured to receive and use the fluid delivery tip assembly 18. The spray tip assembly 14 also includes a spray formation assembly 22 coupled to the fluid delivery tip assembly 18. The spray formation assembly 22 may include a variety of spray formation mechanisms, such as air, rotary, and electrostatic atomization mechanisms. However, the illustrated spray formation assembly 22 comprises an air atomization cap 24, which is typically removably secured to the body 16 via a retaining nut 26.

The air atomization cap 24 includes a variety of air atomization orifices, such as a central atomization orifice 28 disposed about a fluid tip exit 30 from the fluid delivery tip assembly 18. The air atomization cap 24 also may have one or more spray shaping orifices, such as shaping air horn orifice(s) 32, which force the spray to form a desired spray pattern (e.g., a flat spray). The spray formation assembly 22 also may comprise a variety of other atomization mechanisms to provide a desired spray pattern and droplet distribution. In addition, as described in greater detail below, the spray formation assembly 22 may include mechanisms for delivering a first component material (e.g., a first fluid) between, next to, or inside of the shaping air horn orifice(s) 32. For example, in the embodiment illustrated in FIG. 1, tubes 34 may be used to deliver the first fluid between, next to, or inside of the shaping air horn orifice(s) 32. The tubes 34 may be flexible tubular connectors, fixed shape tubular connectors, or other suitable connectors.

The body 16 of the spray coating gun 12 includes a variety of controls and supply mechanisms for the spray tip assembly 14. As illustrated, the body 16 includes a fluid delivery assembly 36 having a fluid passage 38 extending from a fluid inlet coupling 40 through the fluid delivery tip assembly 18. The fluid delivery assembly 36 also comprises a fluid valve assembly 42 to control the flow of the second fluid through the fluid passage 38 and through the fluid delivery tip assembly 18. The illustrated fluid valve assembly 42 has a needle valve 44 extending movably through the body 16 between the fluid delivery tip assembly 18 and a valve adjuster 46. In certain embodiments, the valve adjuster 46 may be rotatably adjustable against a spring 48 disposed between a rear section 50 of the needle valve 44 and an internal portion 52 of the valve adjuster 46.

The needle valve 44 is also coupled to a trigger 54, such that the needle valve 44 may be moved inwardly away from the fluid delivery tip assembly 18 as the trigger 54 is rotated counter clockwise about a pivot joint 56. However, any suitable inwardly or outwardly openable valve assembly may be used within the scope of the present embodiments. As the needle valve 44 moves inwardly away from the fluid delivery tip assembly 18, the second fluid may be allowed to flow through the fluid passage 38 toward the fluid tip exit 30. More specifically, in certain embodiments, the second fluid flowing through the fluid passage 38 may be pressure fed such that when the needle valve 44 moves away from the fluid tip exit 30, the pressure of the second fluid may cause the second fluid to exit through the fluid tip exit 30. In addition, in other embodiments, the second fluid may be delivered through the fluid passage 38 using suction feed techniques. In other words, the second fluid may be siphoned through the fluid tip exit 30 by a low pressure area created by the flow of the second fluid. In certain embodiments, the fluid valve assembly 42 also may include a variety of packing and seal assemblies, such as packing assembly 58, disposed between the needle valve 44 and the body 16.

An air supply assembly 60 is also disposed in the body 16 to facilitate atomization at the spray formation assembly 22. The illustrated air supply assembly 60 extends from an air inlet coupling 62 to the air atomization cap 24 via air passages 64 and 66. The air supply assembly 60 also includes a variety of seal assemblies, air valve assemblies, and air valve adjusters to maintain and regulate the air pressure and flow through the spray coating gun 12. For example, the illustrated air supply assembly 60 includes an air valve assembly 68 coupled to the trigger 54, such that rotation of the trigger 54 about the pivot joint 56 opens the air valve assembly 68 to allow air flow from the air passage 64 to the air passage 66. The air supply assembly 60 also includes an air valve adjustor 70 coupled to a needle 72, such that the needle 72 is movable via rotation of the air valve adjustor 70 to regulate the air flow to the air atomization cap 24. As illustrated, the trigger 54 is coupled to both the fluid valve assembly 42 and the air valve assembly 68, such that the second fluid and air simultaneously flow to the spray tip assembly 14 as the trigger 54 is pulled toward a handle 74 of the body 16. Once engaged, the spray coating gun 12 produces an atomized spray with a desired spray pattern and droplet distribution. As further illustrated, an air conduit 76 is coupled to the air inlet coupling 62 and a fluid conduit 78 is coupled to the fluid inlet coupling 40.

Figure 2:
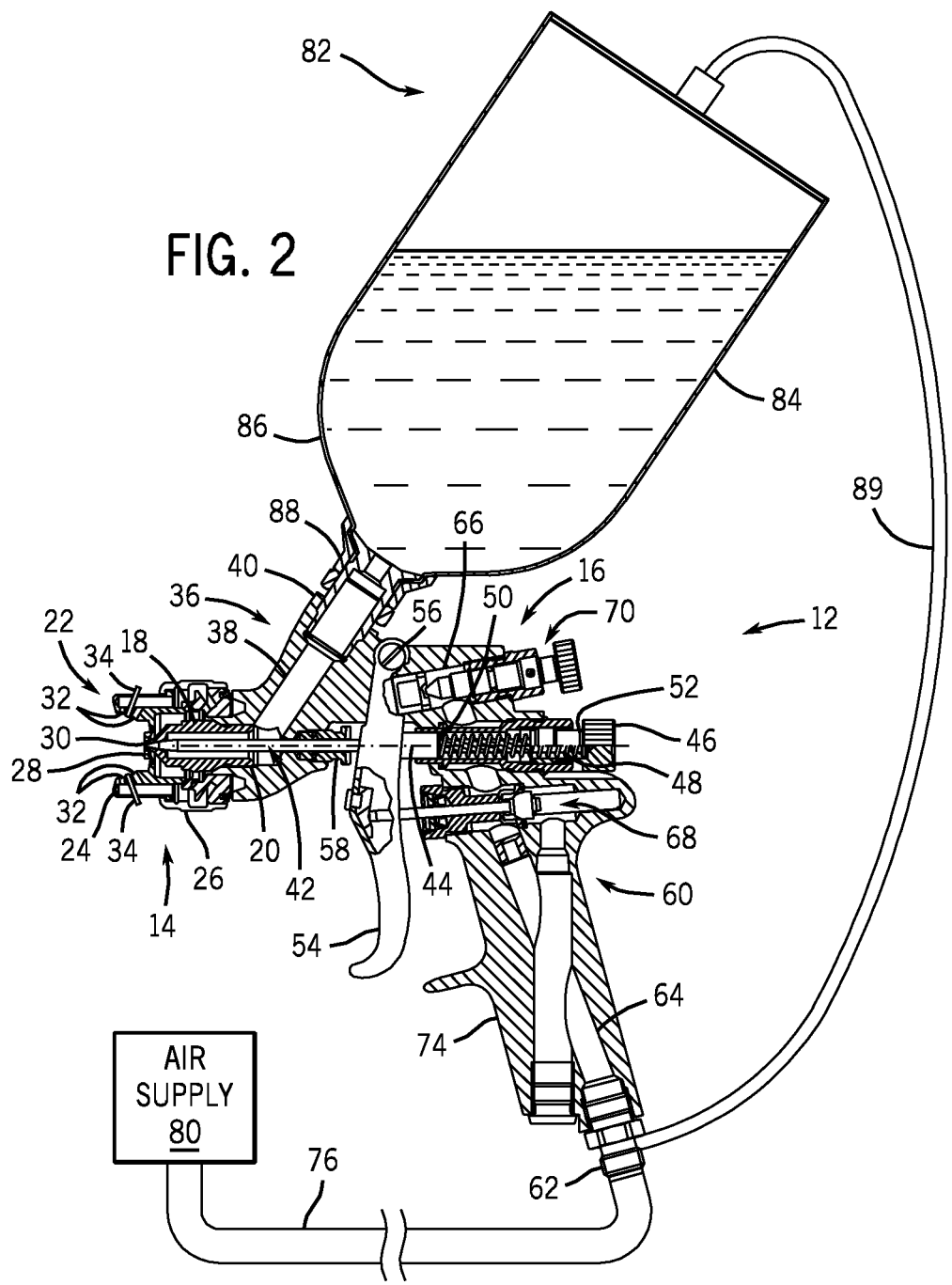

FIG. 2 is a cross-sectional side view illustrating an alternative embodiment of the spray coating gun 12. In the embodiment illustrated in FIG. 2, an air supply 80 is coupled to the air inlet coupling 62 via the air conduit 76. Embodiments of the air supply 80 may include an air compressor, a compressed air tank, a compressed inert gas tank, or a combination thereof. In contrast to the embodiment of FIG. 1, the illustrated embodiment of FIG. 2 has a fluid supply 82 directly mounted to the spray coating gun 12. In other words, the fluid supply 82 is arranged in an on-gun configuration, such that the user can add the fluid mixture without putting down the spray coating gun 12 and/or without substantially delaying the spray process. The illustrated fluid supply 82 includes a gravity feed canister or cup 84 coupled to the fluid inlet coupling 40 on a top side of the body 16. The fluid supply 82 may be described as a top-mounted on-gun configuration. The cup 84 has a tapered portion 86, which leads to an outlet connector 88 coupled to the fluid inlet coupling 40. The fluid supply 82 may include a filtered vent, a collapsible wall portion, an air supply, or a pressure balancer to facilitate the gravity feed.

The specific embodiments illustrated in FIGS. 1 and 2 are merely intended to be exemplary. In other embodiments, air and fluid sources may connect to the spray coating gun 12 in different ways. For example, in certain embodiments, the cup 84 of the spray coating gun 12 of FIG. 2 may also be pressurized. For example, air for the pressure feeding may be used from the air supply 80. In particular, a pressure feed air supply tube 89 may be connected near the air inlet coupling 62 of the spray coating gun 12, and may direct air used to facilitate pressure feeding from the cup 84. In addition, in certain embodiments, the cup 84 may not be attached via a coupling. Furthermore, in certain embodiments, the cup 84 may be mounted on a side of the spray coating gun 12. Regardless, no matter how the air and fluid sources are connected to the spray coating gun 12, when the trigger 54 is pulled toward the handle 74 of the body 16, the second fluid flows through the fluid tip exit 30.

Figure 3A:
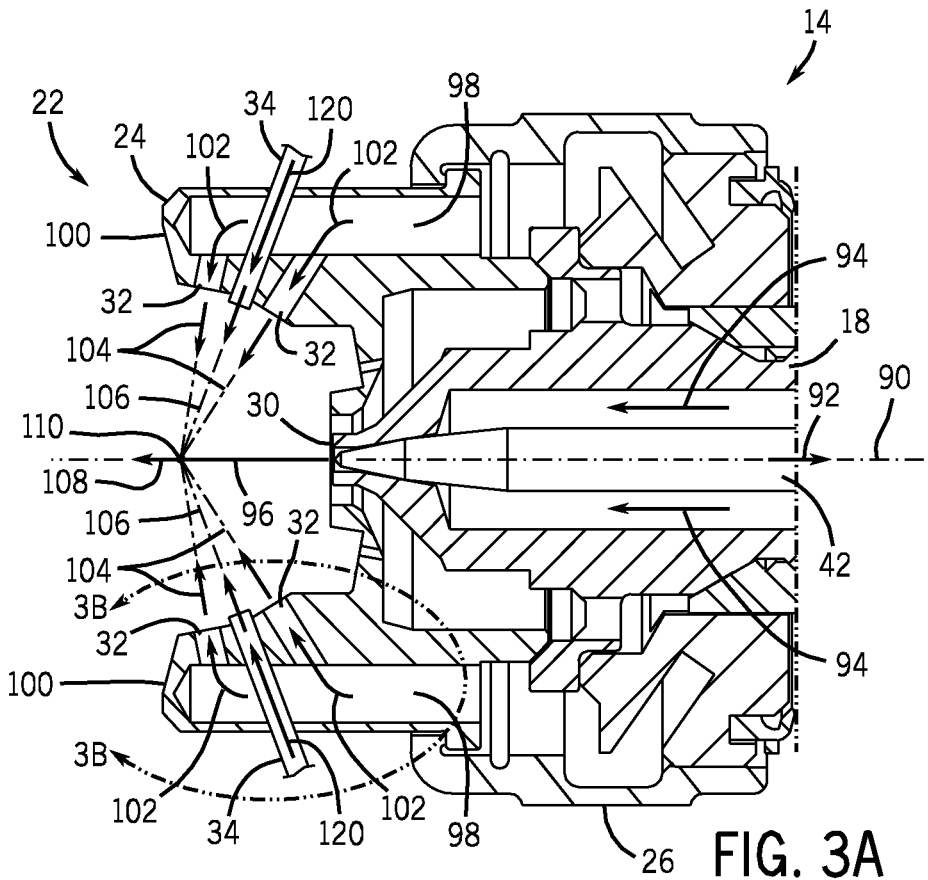
Figure 3B:
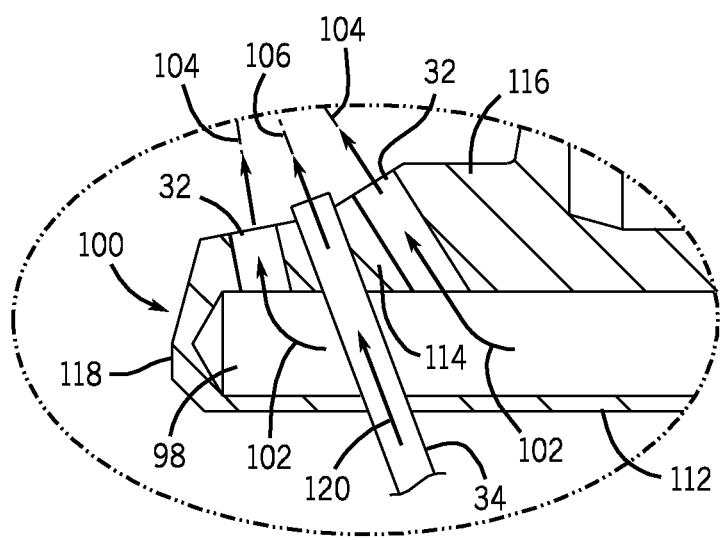

Whether pressure feed, suction feed, or gravity feed techniques are used for delivering the second fluid through the fluid tip exit 30, the disclosed embodiments include techniques for delivering the first fluid between, near to, or inside of the shaping air horn orifice(s) 32 (e.g., horn holes) described above. For example, FIGS. 3A and 3B are partial cross-sectional side views illustrating an exemplary embodiment of the spray tip assembly 14 of FIGS. 1 and 2. As described above, when the trigger 54 is pulled, the fluid valve assembly 42 and needle valve 44 move inwardly away from the fluid delivery tip assembly 18 along a common central axis 90 of the spray coating gun 12, as illustrated by arrow 92. This movement of the fluid valve assembly 42 and needle valve 44 allows the second fluid to flow toward the fluid tip exit 30 of the fluid delivery tip assembly 18, as illustrated by arrows 94. As such, the second fluid exits the fluid tip exit 30 along the common central axis 90, as illustrated by arrow 96.

At the same time, shaping air flows through inner passages 98 within shaping air horns 100 of the air atomization cap 24, as illustrated by arrows 102, and then exits through the shaping air horn orifice(s) 32. In particular, the air atomization cap 24 typically includes at least two shaping air horns 100 located on opposite sides of the air atomization cap 24. In general, the shaping air from the shaping air horn orifice(s) 32 is used to shape the second fluid into a desired spray pattern and droplet distribution. In particular, shaping air from the shaping air horn orifice(s) 32 is directed toward the second fluid stream 96, as illustrated by arrows 104. It should be noted that while the disclosed embodiments illustrate a particular type of shaping air horn 100, in other embodiments, the shaping air horns 100 may includes different designs, shapes, and configurations. Indeed, in certain embodiments, the air atomization cap 24 may have a conical shape, without the typical shaping air horn 100 protrusions. However, regardless of the particular design, shape, and configuration, the air atomization cap 24 includes shaping air horn orifice(s) 32 for shaping the second fluid into a desired spray pattern and droplet distribution.

In addition, in the disclosed embodiments, the first fluid may be delivered between, next to, or inside of the shaping air horn orifice(s) 32 and may converge with the second fluid stream 96, as illustrated by arrows 106. The combination of the first fluid stream 106 and the second fluid stream 96 may combine to form the multiple fluid stream 108 that may be directed toward the object being sprayed (e.g., substrates such as vehicles, vehicle bodies, vehicle body parts, and so forth). As such, the first and second fluids are not premixed. Rather, the first and second fluids are mixed in front of the spray coating gun 12. In particular, the first and second fluids may generally be mixed together proximate to a convergence point or region 110, which generally lies along the common central axis 90 of the spray coating gun 12. The first fluid stream 106 may be delivered using gravity feed techniques, pressure feed techniques, suction feed techniques, or any other suitable method of delivery.

In the embodiment illustrated in FIGS. 3A and 3B, tubes 34 may be located between or next to the shaping air horn orifice(s) 32. For example, each tube 34 may extend through an outer wall 112 of the shaping air horn 100 and through a section 114 of an inner wall 116 of the shaping air horn 100. In particular, the section 114 of the inner wall 116 is the section between or next to the shaping air horn orifice(s) 32 through the inner wall 116 of the shaping air horn 100. As such, each tube 34 extends through the outer wall 112 of the shaping air horn 100 and through the section 114 of the inner wall 116 of the shaping air horn 100. The inner passages 98 of the shaping air horns 100 are wider in a circumferential direction (e.g., into the plane of FIGS. 3A and 3B) than an outer diameter of the tubes 34. As such, the shaping air may flow around the tubes 34 to reach the shaping air horn orifice(s) 32 near a distal end 118 of the shaping air horns 100.

The first fluid may flow through each tube 34, as illustrated by arrows 120. As such, the flow of the first fluid through the tubes 34 is delivered between or next to the shaping air horn orifice(s) 32 toward the second fluid stream 96, as illustrated by arrows 106 and described above. In certain embodiments, the first fluid stream 120 may be supplied from a source external to the spray coating gun 12. However, in other embodiments, the source of the first fluid stream 120 may be integrated into (e.g., mounted onto) the spray coating gun 12. In either case, the first fluid stream 120 may be pressure fed, gravity fed, suction fed, or may be introduced into the tubes 34 by any technique suitable for delivering the first fluid between or next to the shaping air horn orifice(s) 32.

For example, in certain embodiments, the first fluid stream 120 may be pressurized to enable the flow of the first fluid stream 120 through the tubes 34. Indeed, in certain embodiments, the pressure and/or flow rate of the first fluid stream 120 through the tubes 34 may be selectively adjusted based on operating conditions of the spray coating gun 12. For example, the pressure of the first fluid stream 120 through the tubes 34 may be selectively adjusted based on pressures and/or flow rates of the second fluid stream 96 delivered from the fluid tip exit 30. The selective adjustment of pressures and/or flow rates of the first and second fluids may be performed during calibration of the spray coating gun 12. In addition, other operating parameters of the first and second spray fluids may be maintained and/or adjusted during operation of the spray coating gun 12. For example, the material viscosities of the first and second fluids may be selectively adjusted during operation of the spray coating gun 12 to ensure that the viscosity of the multiple fluid stream 108 stays within a desired range. Selectively adjusting the viscosities of the first and second fluids may offset the tendency of the multiple fluid stream 108 to escalate due to curing. Furthermore, the sizing of tubing, an in-line fluid regulator, and so forth, of the spray coating gun 12 may be adjusted based on expected ranges of flow rates for the first and second fluids.

Figure 4A:
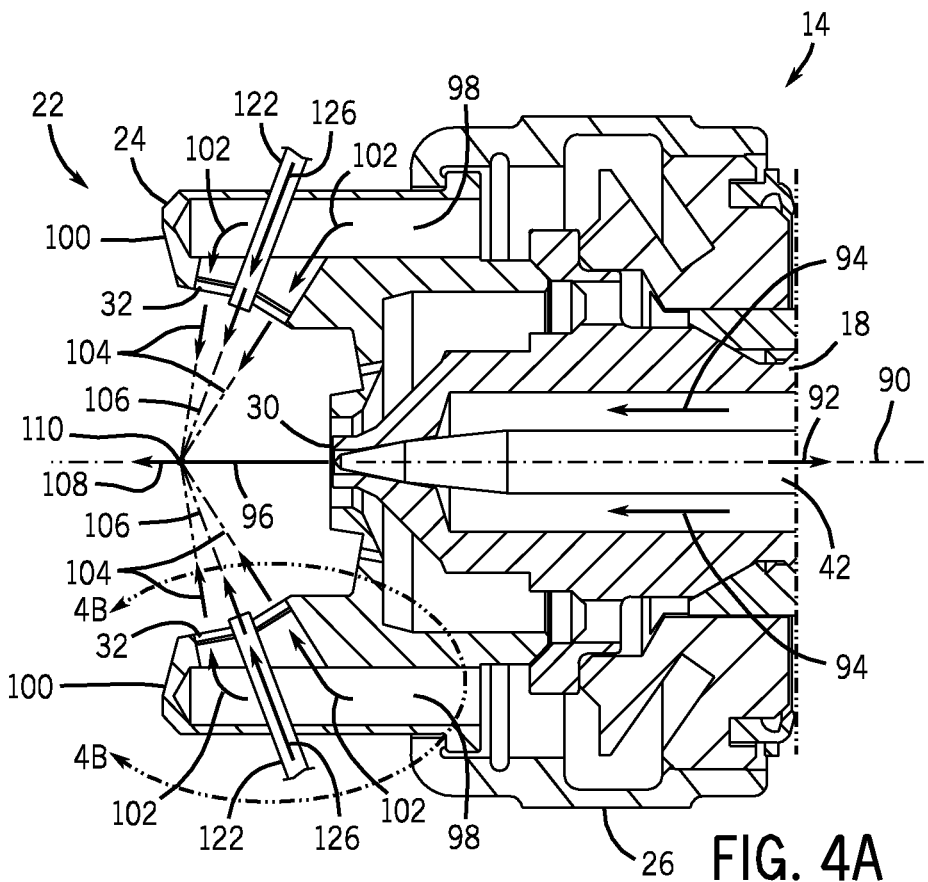
Figure 4B:
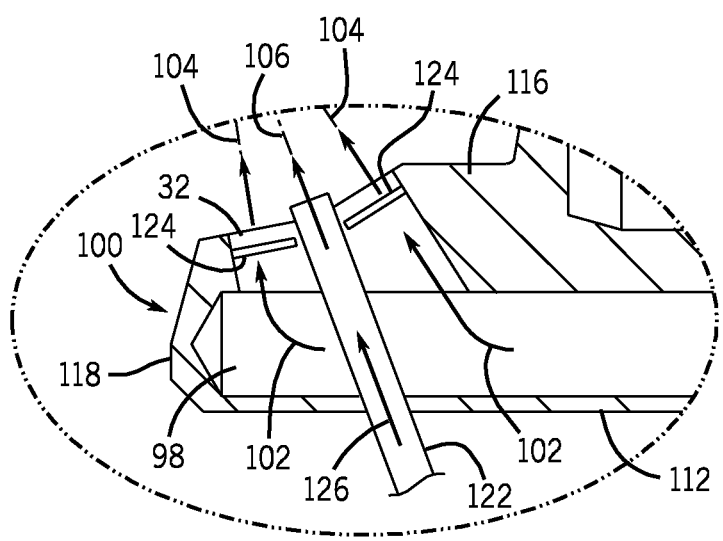

Instead of being delivered between or next to shaping air horn orifice(s) 32, in certain embodiments, the first fluid may be delivered through shaping air horn orifice(s) 32. For example, FIGS. 4A and 4B are partial cross-sectional side views illustrating an alternative embodiment of the spray tip assembly 14 of FIGS. 1 and 2. In the embodiment illustrated in FIGS. 4A and 4B, each tube 122 may be located inside of a shaping air horn orifice 32. For example, each tube 122 may extend through the outer wall 112 of the shaping air horn 100 and through a shaping air horn orifice 32. Again, the tubes 122 may be flexible tubular connectors, fixed shape tubular connectors, or other suitable connectors. In certain embodiments, guides 124 extending from the inner wall 116 of the shaping air horn 100 may be used to position the tubes 122 within the shaping air horn orifice(s) 32. For example, the guides 124 may be prong-like extensions from the inner wall 116 of the shaping air horn 100 such that the shaping air may flow between the guides 124 through the shaping air horn orifice 32.

The first fluid may flow through each tube 122, as illustrated by arrows 126. As such, the flow of the first fluid through each tube 122 is delivered inside of the shaping air horn orifice 32 toward the second fluid stream 96, as illustrated by arrows 106 and described above. In certain embodiments, the first fluid stream 126 may be supplied from a source external to the spray coating gun 12. However, in other embodiments, the source of the first fluid stream 126 may be integrated into (e.g., mounted onto) the spray coating gun 12. In either case, the first fluid stream 126 may be pressure fed, gravity fed, suction fed, or may be introduced into the tubes 122 by any technique suitable for delivering the first fluid inside of the shaping air horn orifice 32.

For example, in certain embodiments, the first fluid stream 126 may be pressurized to enable the flow of the first fluid stream 126 through the tube 122. Indeed, in certain embodiments, the pressure and/or flow rate of the first fluid stream 126 through the tubes 122 may be selectively adjusted based on operating conditions of the spray coating gun 12. For example, the pressure of the first fluid stream 126 through the tubes 122 may be selectively adjusted based on pressures and/or flow rates of the second fluid stream 96 delivered from the fluid tip exit 30. The selective adjustment of pressures and/or flow rates of the first and second fluids may be performed during calibration of the spray coating gun 12. In addition, other operating parameters of the first and second spray fluids may be maintained and/or adjusted during operation of the spray coating gun 12. For example, the material viscosities of the first and second fluids may be selectively adjusted during operation of the spray coating gun 12 to ensure that the viscosity of the multiple fluid stream 108 stays within a desired range. Selectively adjusting the viscosities of the first and second fluids may offset the tendency of the multiple fluid stream 108 to escalate due to curing. Furthermore, the sizing of tubing, an in-line fluid regulator, and so forth, of the spray coating gun 12 may be adjusted based on expected ranges of flow rates for the first and second fluids.

Figure 5A:
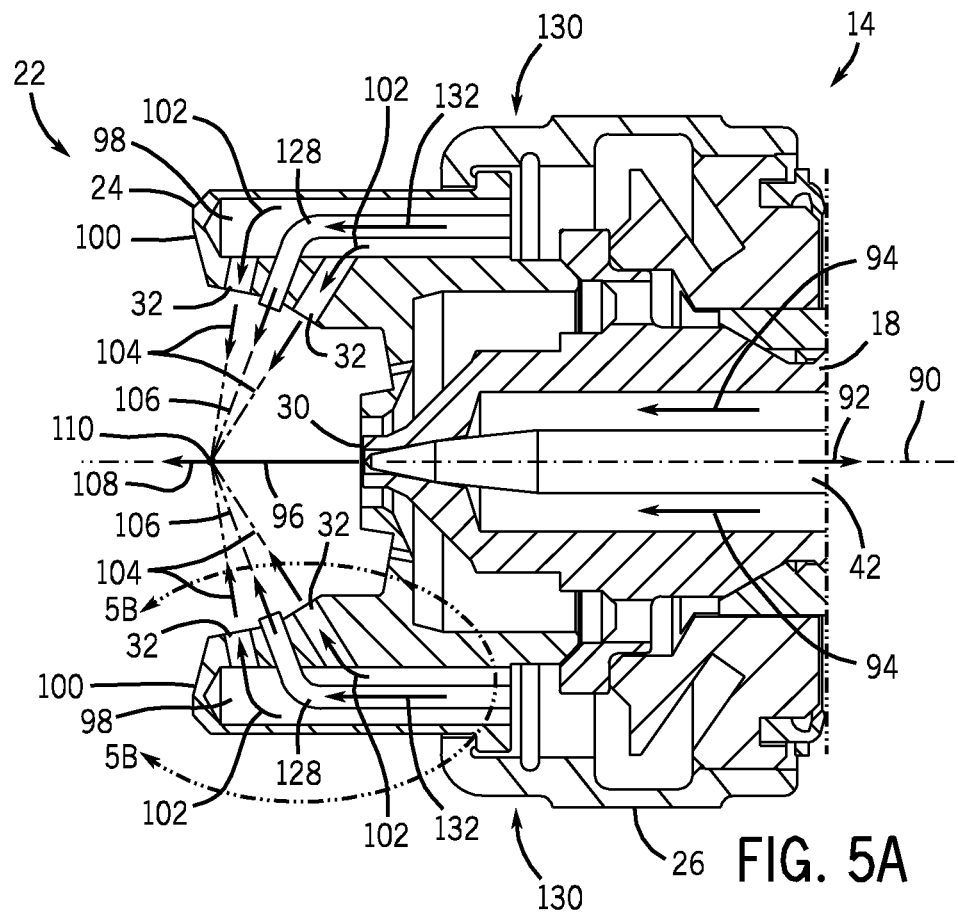
Figure 5B:
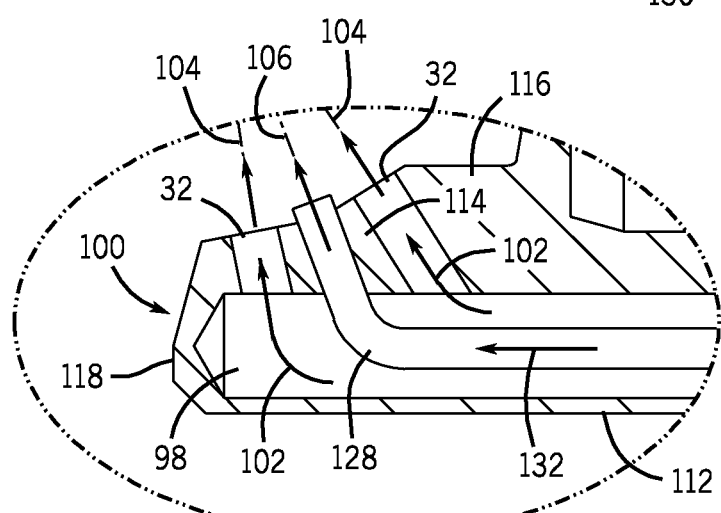

In certain embodiments, the tubes delivering the first fluid may not extend through the outer walls 112 of the shaping air horns 100. For example, FIGS. 5A and 5B are partial cross-sectional side views illustrating another alternative embodiment of the spray tip assembly 14 of FIGS. 1 and 2. In the embodiment illustrated in FIGS. 5A and 5B, each tube 128 may be located within the inner passage 98 of the shaping air horn 100. As such, each tube 128 may extend from a proximal end 130 of the shaping air horn 100 through the section 114 of the inner wall 116 of the shaping air horn 100. Because the tubes 128 are located within the inner passages 98, the shaping air flows around the tubes 128 to reach the shaping air horn orifice(s) 32.

The first fluid may flow through each tube 128, as illustrated by arrows 132. As such, the flow of the first fluid through the tubes 128 is delivered between, next to, or inside of the shaping air horn orifice(s) 32 toward the second fluid stream 96, as illustrated by arrows 106 and described above. Again, the tubes 128 may be flexible tubular connectors, fixed shape tubular connectors, or other suitable connectors. In certain embodiments, the first fluid stream 132 may be supplied from a source external to the spray coating gun 12. However, in other embodiments, the source of the first fluid stream 132 may be integrated into (e.g., mounted onto) the spray coating gun 12. In either case, the first fluid stream 132 may be pressure fed, gravity fed, suction fed, or may be introduced into the tubes 128 by any technique suitable for delivering the first fluid between, next to, or inside of the shaping air horn orifice(s) 32.

For example, in certain embodiments, the first fluid stream 132 may be pressurized to enable the flow of the first fluid stream 132 through the tubes 128. Indeed, in certain embodiments, the pressure and/or flow rate of the first fluid stream 132 through the tubes 128 may be selectively adjusted based on operating conditions of the spray coating gun 12. For example, the pressure of the first fluid stream 132 through the tubes 128 may be selectively adjusted based on pressures and/or flow rates of the second fluid stream 96 delivered from the fluid tip exit 30. The selective adjustment of pressures and/or flow rates of the first and second fluids may be performed during calibration of the spray coating gun 12. In addition, other operating parameters of the first and second spray fluids may be maintained and/or adjusted during operation of the spray coating gun 12. For example, the material viscosities of the first and second fluids may be selectively adjusted during operation of the spray coating gun 12 to ensure that the viscosity of the multiple fluid stream 108 stays within a desired range. Selectively adjusting the viscosities of the first and second fluids may offset the tendency of the multiple fluid stream 108 to escalate due to curing. Furthermore, the sizing of tubing, an in-line fluid regulator, and so forth, of the spray coating gun 12 may be adjusted based on expected ranges of flow rates for the first and second fluids.

Figure 6A:
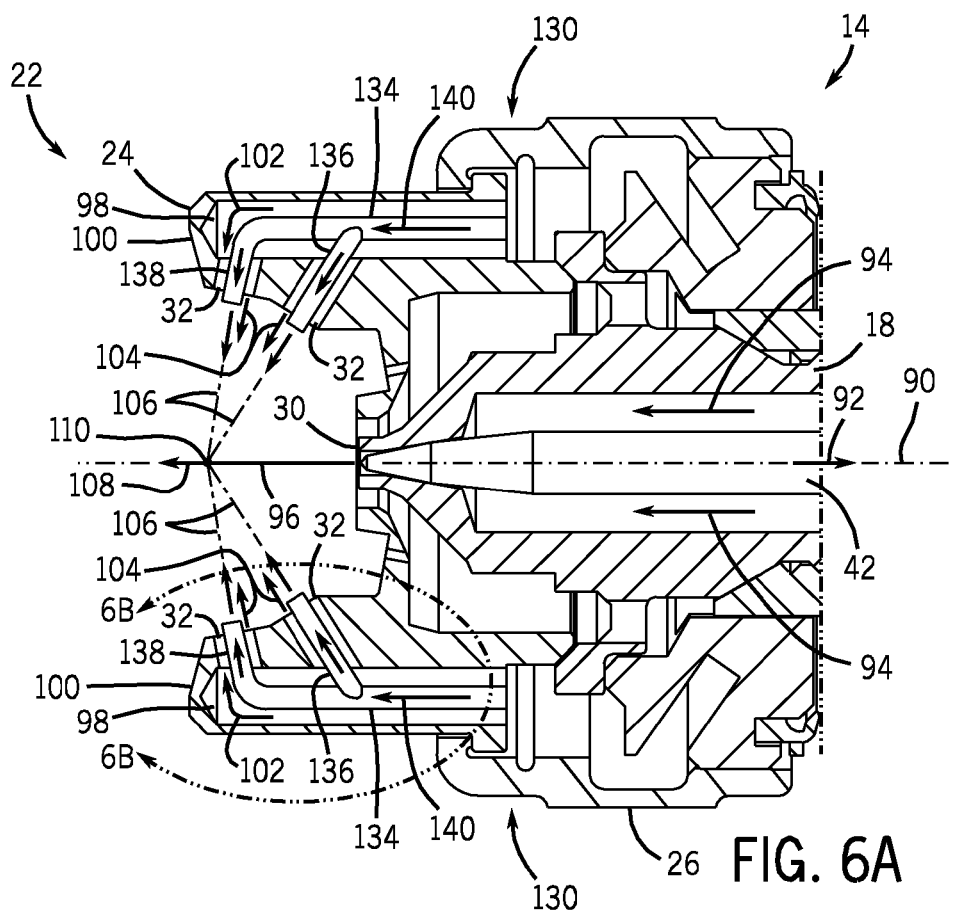
Figure 6B:
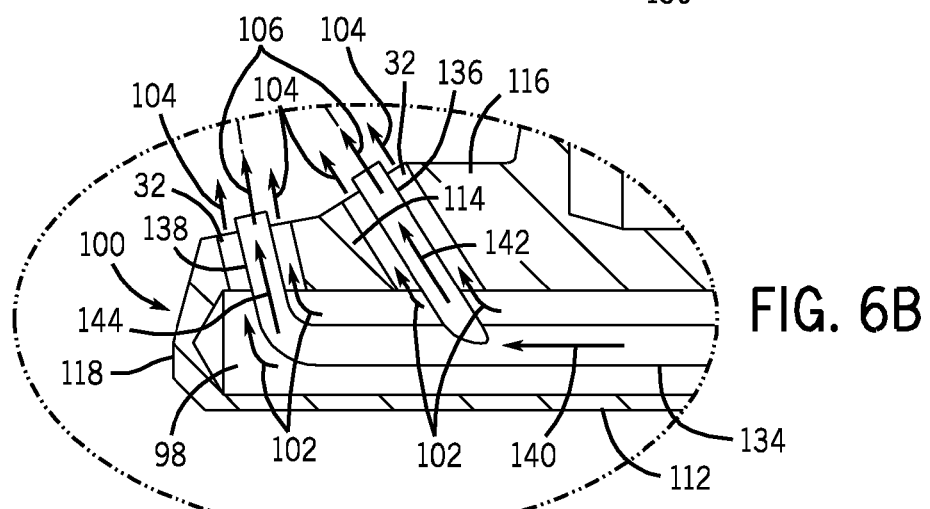

In certain embodiments, the tubes extending from the proximal end 130 of the shaping air horn 100 may not extend through the section 114 of the inner wall 116 of the shaping air horn 100. For example, FIGS. 6A and 6B are partial cross-sectional side views illustrating yet another alternative embodiment of the spray tip assembly 14 of FIGS. 1 and 2. In the embodiment illustrated in FIGS. 6A and 6B, each tube 134 may be located within the inner passage 98 of the shaping air horn 100. However, instead of extending through the section 114 of the inner wall 116 of the shaping air horn 100, each tube 134 may extend from the proximal end 130 of the shaping air horn 100 and through a shaping air horn orifice 32. In the particular embodiment illustrated in FIGS. 6A and 6B, the tube 134 may be split into first and second tube ends 136, 138 with each tube end 136, 138 extending through a respective shaping air horn orifice 32. However, although illustrated in FIGS. 6A and 6B as including two tube ends 136, 138, any number of tube ends through any number of shaping air horn orifice(s) 32 may be used.

As illustrated in FIGS. 6A and 6B, the first fluid may flow through each tube 134, as illustrated by arrows 140. In addition, for each tube end 136, 138 that splits off from each tube 134, a respective flow of the first fluid may flow through the tube ends 136, 138, as illustrated by arrows 142, 144. As such, the flow of the first fluid through the tube ends 136, 138 is delivered inside of the shaping air horn orifice(s) 32 toward the second fluid stream 96, as illustrated by arrows 106 and described above. Again, the tubes 134 and tube ends 136, 138 may be flexible tubular connectors, fixed shape tubular connectors, or other suitable connectors. In certain embodiments, the first fluid stream 140 may be supplied from a source external to the spray coating gun 12. However, in other embodiments, the source of the first fluid stream 140 may be integrated into (e.g., mounted onto) the spray coating gun 12. In either case, the first fluid stream 140 may be pressure fed, gravity fed, suction fed, or may be introduced into the tubes 134 by any technique suitable for delivering the first fluid between, next to, or inside of the shaping air horn orifice(s) 32.

For example, in certain embodiments, the first fluid stream 140 may be pressurized to enable the flow of the first fluid streams 140, 142, 144 through the tubes 134 and tube ends 136, 138. Indeed, in certain embodiments, the pressure and/or flow rate of the first fluid streams 140, 142, 144 through the tubes 134 and tube ends 136, 138 may be selectively adjusted based on operating conditions of the spray coating gun 12. For example, the pressure of the first fluid stream 140 through the tubes 134 may be selectively adjusted based on pressures and/or flow rates of the second fluid stream 96 delivered from the fluid tip exit 30. The selective adjustment of pressures and/or flow rates of the first and second fluids may be performed during calibration of the spray coating gun 12. In addition, other operating parameters of the first and second spray fluids may be maintained and/or adjusted during operation of the spray coating gun 12. For example, the material viscosities of the first and second fluids may be selectively adjusted during operation of the spray coating gun 12 to ensure that the viscosity of the multiple fluid stream 108 stays within a desired range. Selectively adjusting the viscosities of the first and second fluids may offset the tendency of the multiple fluid stream 108 to escalate due to curing. Furthermore, the sizing of tubing, an in-line fluid regulator, and so forth, of the spray coating gun 12 may be adjusted based on expected ranges of flow rates for the first and second fluids.

In certain embodiments, the first component material (e.g., first spray fluid) may comprise an activator (e.g., thinner), whereas the second component material (e.g., second spray fluid) may comprise paint. However, in other embodiments, different liquids may be used as the component materials with the disclosed embodiments. In other words, the spray coating gun 12 may have applications with various types of plural component materials, and are not limited to paints and activators. In addition, although the disclosed embodiments disclose the use of two component materials, in other embodiments, more than two component materials may be mixed. For example, in certain embodiments, different component materials (e.g., spray fluids) may be delivered between, near to, or inside of shaping air horn orifice(s) 32 in different shaping air horns 100. In other words, one spray fluid may be delivered between, near to, or inside of shaping air horn orifice(s) 32 in one of the shaping air horns 100, whereas another spray fluid may be delivered between, near to, or inside of shaping air horn orifice(s) 32 in another of the shaping air horns 100. Indeed, any number of spray fluids may be delivered between, near to, or inside of shaping air horn orifice(s) 32 in any number of shaping air horns 100. As such, the disclosed embodiments may also enable other applications, such as color mixing.

The embodiments described herein enable the delivery of the first component material between, near to, or inside of shaping air horn orifice(s) 32 while enabling the delivery of the second component material through the fluid tip exit 30 of the fluid delivery tip assembly 18. The delivery of the first and second component materials may be synchronized such that the first and second component materials mix in an appropriate ratio. By not premixing the first and second component materials, excess waste material created by the painter may be minimized because the painter only uses as much of the first and second component materials as needed. Further, because mixing of the first and second component materials generally occurs in front of the fluid tip exit 30 of the fluid delivery tip assembly 18, the disclosed embodiments may reduce cleanup time as well as provide the painter with more time before having to clean the components of the spray coating gun 12. As such, the disclosed embodiments provide a user friendly, compact way of spraying multiple component materials.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A spray coating gun, comprising:
a fluid delivery tip assembly;
an air atomization cap disposed coaxially around the fluid delivery tip assembly, wherein the air atomization cap comprises one or more shaping air horns configured to deliver shaping air, and each shaping air horn comprises a first spray fluid passage configured to deliver a first spray fluid inside of one or more shaping air streams from the shaping air horn, wherein each shaping air horn comprises a shaping air horn orifice on an inner wall of the shaping air horn, the first spray fluid passage comprises a tube extending through the shaping air horn orifice, and a shaping air stream of the one or more shaping air streams flows around the tube through the shaping air horn orifice; and
a second spray fluid passage configured to deliver a second spray fluid to a fluid tip exit of the fluid delivery tip assembly.

2. The spray coating gun of claim 1, wherein the first spray fluid is delivered through the first spray fluid passage using pressure feed techniques, suction feed techniques, or gravity feed techniques.

3. The spray coating gun of claim 1, wherein the second spray fluid is delivered through the second spray fluid passage using pressure feed techniques, suction feed techniques, or gravity feed techniques.

4. The spray coating gun of claim 1, wherein the first spray fluid comprises a first component material and the second spray fluid comprises a second component material different than the first component material.

5. A system, comprising:
an air atomization cap having one or more shaping air horns configured to deliver shaping air, wherein each shaping air horn comprises a first spray fluid passage configured to deliver a first spray fluid inside of one or more shaping air streams from the shaping air horn, wherein each shaping air horn comprises a shaping air horn orifice on an inner wall of the shaping air horn, the first spray fluid passage comprises a tube extending through the shaping air horn orifice, and a shaping air stream of the one or more shaping air streams flows around the tube through the shaping air horn orifice.

6. The system of claim 5, wherein the first spray fluid is delivered through the first spray fluid passage using pressure feed techniques, suction feed techniques, or gravity feed techniques.

7. The system of claim 5, comprising a fluid delivery tip assembly having a second spray fluid passage configured to deliver a second spray fluid through a fluid tip exit of the fluid delivery tip assembly.

8. A method, comprising:
delivering a first spray fluid inside of shaping air streams delivered from a shaping air horn of an air atomization cap, wherein delivering the first spray fluid comprises delivering the first spray fluid via a tube extending through a shaping air horn orifice on an inner wall of the shaping air horn, and a first shaping air stream of the shaping air streams is delivered around the tube through the shaping air horn orifice.

9. The spray coating gun of claim 1, wherein each shaping air horn comprises one or more guides extending from the inner wall of the shaping air horn, wherein the one or more guides position the tube within the shaping air horn orifice.

10. The spray coating gun of claim 9, wherein the one or more guides comprise prong-like extensions extending from the inner wall of the shaping air horn.

11. The system of claim 5, wherein each shaping air horn comprises one or more guides extending from the inner wall of the shaping air horn, wherein the one or more guides position the tube within the shaping air horn orifice.

12. The system of claim 11, wherein the one or more guides comprise prong-like extensions extending from the inner wall of the shaping air horn.

13. The method of claim 8, comprising selectively adjusting a pressure or flow rate of the first spray fluid through the tube.

14. The method of claim 13, comprising selectively adjusting the pressure or the flow rate of the first spray fluid through the tube based on a pressure or flow rate of a second spray fluid delivered from a fluid tip exit of a fluid delivery tip assembly disposed coaxially within the air atomization cap.

15. The method of claim 13, comprising selectively adjusting the pressure or the flow rate of the first spray fluid during calibration of a spray coating gun that comprises the air atomization cap.

16. The method of claim 13, comprising selectively adjusting the pressure or the flow rate of the first spray fluid during operation of a spray coating gun that comprises the air atomization cap.

17. The method of claim 13, comprising selectively adjusting the pressure or the flow rate of the first spray fluid to maintain a viscosity of a combined fluid stream including the first and second spray fluids within a desired range.

18. The method of claim 8, comprising delivering the first spray fluid through the tube using pressure feed techniques, suction feed techniques, or gravity feed techniques.

19. The spray coating gun of claim 1, wherein the tube extends through an outer wall of the shaping air horn.

20. The system of claim 5, wherein the tube extends through an outer wall of the shaping air horn.

* * * * *